Figure 1:
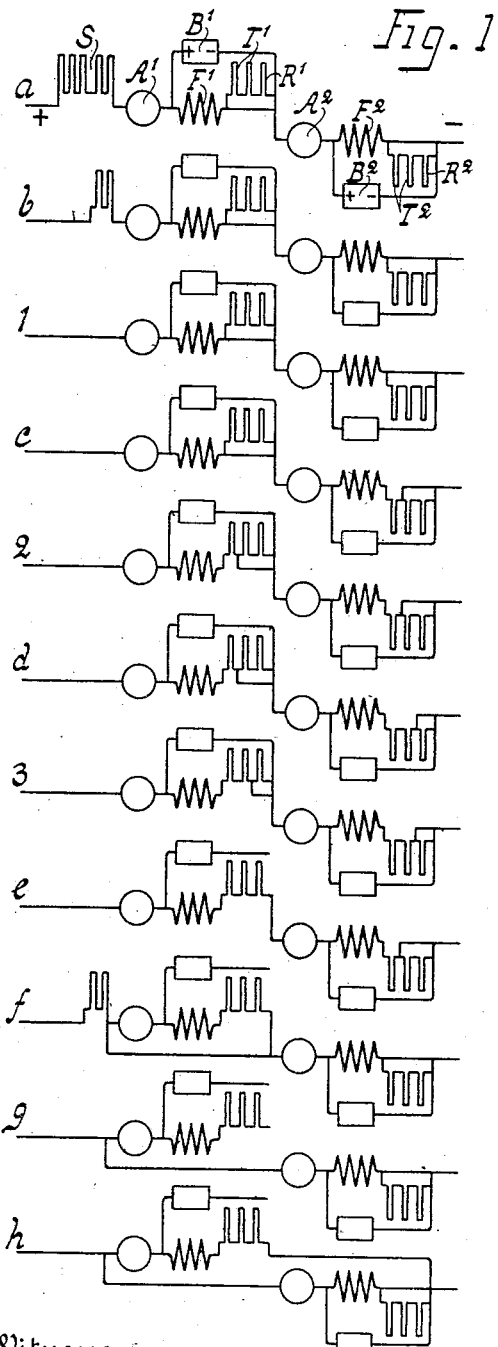

R. LUNDELL.
METHOD OF AND MEANS FOR CONTROLLING REGENERATIVE ELECTRIC MOTORS.
APPLICATION FILED DEC. 21, 1909.

969,894.

Patented Sept. 13, 1910.

R. LUNDELL.
METHOD OF AND MEANS FOR CONTROLLING REGENERATIVE ELECTRIC MOTORS.
APPLICATION FILED DEC. 21, 1909.
969,894.
Patented Sept. 13, 1910.
2 SHEETS—SHEET 2.
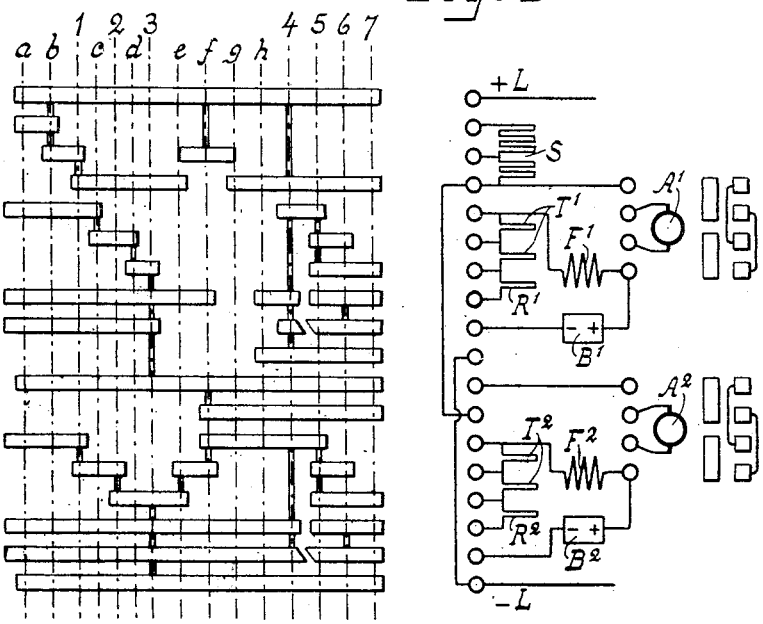
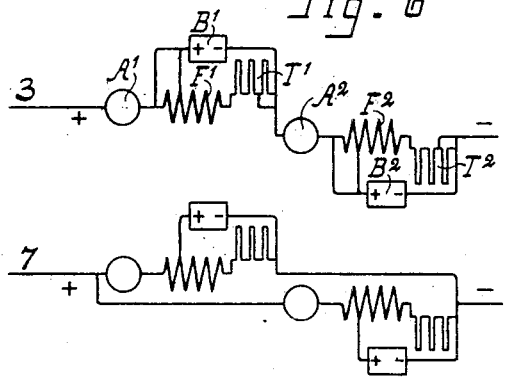
Witnesses:
M. F. Keating
Samuel Harber
Inventor
Robert Lundell
By Attorney
Charles J. Kirtner.

UNITED STATES PATENT OFFICE.

ROBERT LUNDELL, OF NEW YORK, N. Y.

METHOD OF AND MEANS FOR CONTROLLING REGENERATIVE ELECTRIC MOTORS.

969,894.   Specification of Letters Patent.   Patented Sept. 13, 1910.

Application filed December 21, 1909. Serial No. 534,302.

*To all whom it may concern:*

Be it known that I, ROBERT LUNDELL, a citizen of the United States, and resident of New York, borough of Manhattan, county and State of New York, have made a new and useful Invention in Methods of and Means for Controlling Regenerative Electric Motors, of which the following is a specification.

My present invention relates to the control of series motors arranged to be coupled in series-parallel combinations and particularly to that class of motors called "regenerative motors", which are capable of being converted into generators for the purpose of braking and for increasing the efficiency of the apparatus by returning current energy to the line circuit.

A motor may be caused to operate as a generator by making its field strength fully or partially independent of its armature current. This may in turn be accomplished either by shunt excitation, compound excitation, separate excitation or by partially independent excitation and I have heretofore disclosed in various U. S. patents many modifications of such motors. See U. S. Patents Nos. 626,178; 711,667; 716,445; 734,724 and 654,551 of July 24th, 1900. Particular attention is called to the last mentioned patent, which refers to the control of re-generative series motors, because the present invention is a direct improvement upon the invention disclosed in this patent. Said Patent No. 654,551 shows two or four series motors arranged to be coupled in various series-parallel combinations, their series fields being chiefly excited from a source of independent current supply (a motor-generator being shown for this purpose).

The usual method of connecting series motors in series-parallel combinations consisted, at the time of the filing of the application upon which the aforesaid Patent No. 654,551 was based, in coupling each motor field permanently in series with its own armature and in connecting both the field and the armature, as one unit, in series or in parallel with the field and the armature of another motor, such a method of control having been fully disclosed by G. H. Condict in U. S. Patent No. 393,323, November 20th, 1888. In my Patent No. 654,551 referred to, the series fields of the different motors were coupled permanently together in series and the armature circuits alone were connected in series-parallel combinations, this being another method of series-parallel control which became feasible when the series fields were excited from a separate source of current supply, such source being, of course, large enough to control the field excitation under all of the series-parallel combinations as well as under all conditions of load. The main object of coupling the series field windings together was to avoid the duplication of the motor-generator and other parts incidental to an adoption of the Condict method of series-parallel control. It was also realized at the time that a low resistance series field winding, which was being shunted by a low voltage armature circuit of a motor-generator, would be liable to produce a somewhat uncertain excitation due to variations in the condition of the commutator brushes included in the said low voltage armature circuit. It was, therefore, deemed safer—as regards the division of the load of the motors when running in parallel—to have the different motors well matched as to their speed and load characteristics and to couple all of the field windings permanently in series with only one variable and somewhat uncertain source of E. M. F. across the field terminals. However, it is difficult in certain railway work to have the different motors well matched and it becomes for this reason advantageous to individualize the various fields and to provide just as many field circuits and sources of independent current supply as there are motors in the system of control. But some efficient means must be employed for balancing the load between the motors when running in parallel under reduced field excitation, otherwise one of the motors may become badly overloaded. Furthermore, when series motors, provided with independent sources of current supply for their series field windings, are used for traction work, it becomes necessary to provide means by which the series-parallel changes may be made smoothly and without discomfort to the passengers. An ordinary series motor possesses a self-regulating quality as to speed whereas the re-generative type of series motor herein referred to has a fixed speed quality and a "fighting" quality similar to that of a shunt wound motor or a compound wound motor having a weak series winding.

The object of the present invention is to provide certain refinement of detail (over the method disclosed in my basic Patent No. 654,551) which will cause the motors to divide the load properly when running in parallel under reduced field excitation and under traction conditions, and which will cause the series-parallel changes to be made smoothly, even though the conventional external resistances in series with the armature circuits for such purpose are almost entirely avoided. It will be understood that external resistances are objectionable in combination with re-generative motors because they produce too great a difference between the "motor" speeds and the corresponding "generator" speeds.

Another object of the invention is to provide means by which the source of variable voltage across the field windings of the main motors may be avoided and by which a source of constant voltage may be employed. The source of variable voltage has a disadvantage in that the field regulation of the main motors becomes somewhat sluggish due to the time consumed in first effecting the changes in the said variable voltage. The use of a constant voltage makes it not only possible but advantageous to substitute a storage battery for a motor-generator, particularly when the arrangement is such that the battery is automatically charged and discharged under ordinary running conditions.

Figure 2:
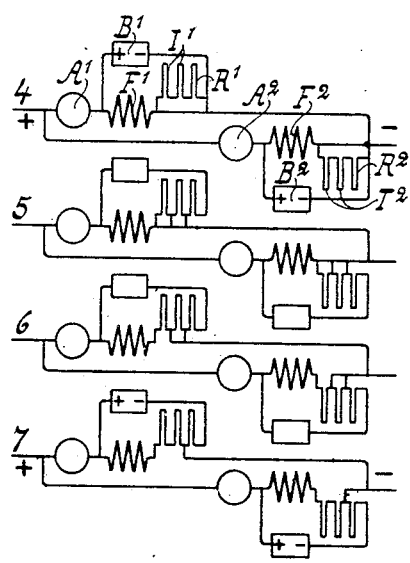
Figure 2:
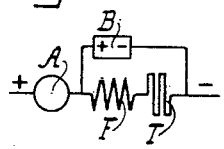
Figure 3:
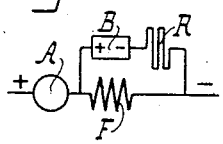
Figure 4:
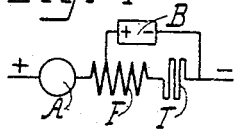

On account of the above explanatory remarks it will now become comparatively easy to grasp the main features of my invention. These features will best be understood by reference to the accompanying drawings, in which, Figure 1 illustrates diagrammatically the successive changes in the circuit connections of a pair of re-generative series motors from the time the said motors are started until they have reached their highest speed. Figs. 2, 3 and 4 show certain circuit diagrams for single motors, which will explain in a simpler form some of the main features of Fig. 1. Fig. 5 shows the development of a rotary controller of ordinary construction arranged to effect the circuit changes which are particularly illustrated in Fig. 1. The said Fig. 5 will only become important to the manufacturer of the apparatus and a minute description of this particular figure is not considered necessary. Fig. 6 illustrates diagrammatically the two most important circuit connections of a pair of re-generative series motors which have been somewhat modified in regard to their field regulation.

In Figs. 1, 5 and 6, $A^1$ and $A^2$ represent, respectively, the armature circuits of a pair of series motors. These armature circuits would also include the inter-pole windings of a pair of inter-pole motors or the compensating windings of a pair of compensated series motors. $F^1$ and $F^2$ represent, respectively, the series field windings, that is, the excitation windings of the said motors. $B^1$ and $B^2$ represent, respectively, two small storage batteries which are connected in shunt with $F^1$ and $F^2$ and which are used in connection with the excitation and the regulation of the motor fields. S represents an external starting resistance which may be divided into two or more parts according to requirements—two parts being shown in Fig. 1. $T^1$ and $T^2$ represent, respectively, field regulating resistances used in connection with the series field windings $F^1$, $F^2$ and the batteries $B^1$, $B^2$ for regulating the field strength and the speed of the motors. Said resistances may each be divided into two or more parts according to requirements—two parts being shown in Fig. 1 and three parts being shown in Fig. 6. $R^1$ and $R^2$ represents, respectively, other resistances, hereinafter called field balancing resistances, which are also used in connection with the said field windings and the said storage batteries but for the specific purpose of balancing the load between the motors when they are running in parallel. These balancing resistances are hereinafter considered as parts of their respective battery circuits, whereas, the above mentioned regulating resistances are parts of their respective field circuits.

In Figs. 2, 3 and 4 the above-mentioned letters without indexes represent, respectively, similar parts of single motors.

Referring again to Fig. 1 the various circuit diagrams designated by the letters $a$, $b$, $c$, $d$, $e$, $f$, $g$ and $h$ represent certain transition connections, most of which are necessary in order to effect a smooth acceleration or a smooth retardation. The other diagrams designated by the numbers 1, 2, 3, 4, 5, 6 and 7 represent the actual running or working connections for the motors. Looking now at Diagram $a$ it will be noticed that the two motors are connected in series through the starting resistance and that both of the storage batteries are connected in shunt to their respective field windings without any of the regulating or balancing resistances being included in the circuits, said resistances being short-circuited. As the internal ohmic resistances of the storage batteries (or of the low voltage armature circuits of motor generators) are extremely small as compared with the ohmic resistances of the field windings, it follows that the field excitation will now be fully controlled by the batteries irrespective of the load or the armature current. The only difference in the excitation would be due to the difference between the charging and the discharging voltage of the storage battery. The speed of the motors would, therefore, be fixed, if the starting resistance were cut out. This resistance has been cut out in Diagram Number 1, but the battery connections have not yet been changed. This diagram indicates the lowest efficient and fixed speed of the motors obtained with strong field excitation. Transition step $c$ changes the battery connections for the second motor only. One portion of the field regulating resistance $T^2$ is now inserted in the field circuit (which includes $F^2$), thereby increasing the ohmic resistance of the field circuit and correspondingly reducing the amperes in the said circuit and, therefore, the field excitation. The reduction in the field excitation of the second motor reduces the counter E. M. F. of its armature, which in turn causes the first motor to consume more of the line voltage than it did in the previous position and the net result is an increase in the speed of both motors. In Diagram Number 2 a similar change has been effected in the field excitation of the first motor and the motors are again consuming an equal amount of the line voltage. The speed has now increased by a considerable amount. Diagram $d$ indicates another transition step in which the field excitation of the second motor has been further reduced by an additional increase in the ohmic resistance of the field circuit, producing in turn a further increase in the speed of the motors. In Diagram Number 3 the field excitation of the first motor has also been further reduced by a similar process and the speed has again been increased. This diagram shows the circuit connections for the highest fixed speed when the motors are in series and the entire field regulating resistances are now inserted in their respective field circuits. The speed should now be nearly twice the speed obtained with the connections shown in Diagram Number 1, so that the motors may safely be switched over to the parallel connections without shock to the apparatus and without aid of undue external resistances.

Attention is called to the fact that the field strength must be reduced to one-half of the full field strength in order to double the speed. It should also be pointed out that the armature current must be twice as great with half field strength as with full field strength in order that the torque may remain the same. Furthermore, if there were no saturation of the magnetic circuits in the motors, the regulating resistances $T^1$ and $T^2$ would only have to be equal to the ohmic resistances of their respective field windings in order to double the speed of the motors. But owing to the bend in the saturation curve of an ordinary motor the said resistances should each be about 1.75 times the resistance of the corresponding field winding. It will, however, be understood that the resistances $T^1$ and $T^2$ are still very small as compared with an external starting resistance.

In order to admit a strong armature current without causing such a current to increase the field strength and thereby cause the motors to slow down, it is essential that the batteries $B^1$ and $B^2$ should be connected as shown in the above-mentioned diagrams. In other words, each of the batteries must be connected in shunt to both the field winding and its regulating resistance; that is, relative to the main line circuit as more clearly shown in Fig. 2. The connections shown in Fig. 3 will not answer the purpose of proper field regulation. Looking at this diagram it will be noticed that, relative to the main line circuit, it is the field winding which here forms a shunt to both the battery and the resistance. The result, as to speed, will be the same at no load, but, when a strong line current flows through the armature A, the greater portion of this current will go through the field winding and the net result will be an increase in the field excitation and a reduction in the motor speed. It may be mentioned that the arrangement shown in Fig. 3 has long ago been proposed in connection with the regulation of single motors. See for example:—Fig. 2 of British Patent No. 12,690 of 1895, or U. S. Patent No. 597,018 of Jan. 11th, 1898. The said arrangement, though ineffective as a method of field regulation, becomes useful for balancing the load between two or more motors of the described class, when such motors are connected in parallel. That is to say, a resistance, which will increase the internal resistance of the battery circuit (relative to the main line circuit), will naturally cause part of the armature current or the main line current to become diverted through the series field winding. This will in turn increase the " series-characteristic " of the otherwise independently excited motor. In Fig. 2 it is the battery which diverts the surplus of the main line current by reason of its low internal resistance and its nearly constant counter E. M. F. and while serving this purpose it is automatically being charged. It will in this manner be kept in good condition for the excitation of the field when the motor works as a generator.

Attention is now called to the various transition steps shwn in Fig. 1. Diagram $e$ shows that the excitation of the second motor $A^2$, $F^2$ has been increased and that the field of the first motor has been disconnected from its battery. The first motor is thereby put in a self-regulating condition before it is short-circuited. Diagram $f$ shows the first motor short-circuited and the second motor connected across the line with a small portion of the starting resistance in the circuit. The field excitation of the second motor has also been further increased. Diagram $g$ shows the first motor on open circuit while the second motor with full field strength is receiving the full line voltage. Diagram $h$ shows the second motor connected as before, but the first motor has now been connected as a plain series motor in parallel with the second motor. Diagram Number 4 shows both motors alike in regard to their field excitation and circuit connections. This diagram indicates the connections for the lowest fixed speed when the motors are running in parallel. It is not thought necessary to here introduce any special means for balancing the load between the motors as long as storage batteries are employed in connection with the independent field excitation. The torque characteristics of the motors in connection with full field strength are, furthermore, such that it would not hurt either one of the motors if the load were not evenly divided. But the conditions become entirely different when the field strength is reduced. I provide, therefore, additional means for insuring a division of the load during the following higher speeds.

Diagram Number 5 illustrates clearly the manner in which the balancing resistances $R^1$ and $R^2$ are inserted in their respective battery circuits. As the utility of these resistances has already been explained in connection with Fig. 3 a further description of their balancing effect in regard to the division of the load is not considered necessary. It may be pointed out that these resistances do not need to be large, because their main purpose is to increase the internal ohmic resistances of the storage battery circuits and it should be remembered that the internal resistances of the batteries themselves are extremely low. Diagram Number 6 shows that the balancing resistances are included in the battery circuits as in the previous diagram and that in addition the first portions of the field regulating resistances $T^1$ and $T^2$ have been inserted in their respective field circuits. Diagram Number 7 shows the circuit connections of the motors when they are running in parallel under weak field excitation. See Diagram Number 3 for sake of comparison. The speed at no load will clearly be more than twice the speed obtained in Diagram Number 4, but as the load increases the motors will gradually slow down, chiefly because of the balancing resistances $R^1$ and $R^2$ which have increased the "series motor-characteristic." Looking at the first motor $A^1$, $F^1$, for instance, and assuming a heavy armature current, this current will flow as follows:—from the $+$ line through the armature circuit $A^1$ where it will divide itself, one portion flowing through the field winding $F^1$ and its regulating resistance $T^1$ to the $-$ line, the other portion flowing through the battery charging the same and through the balancing resistance $R^1$ to the $-$ line.

Fig. 6 shows a modification of the described means for increasing the "series motor-characteristic", which will be equally useful in balancing the load between the motors. It will be noticed that the field winding is in this figure furnished with an extra connection which divides the winding into two portions, one of which is chiefly controlled by the battery current and the other (the smaller one) by the armature current. Fig. 6 illustrates in two diagrams the most important circuit connections of a pair of motors, which have been arranged according to the said modification. The diagrams correspond with the diagrams having similar numbers in Fig. 1. Diagram Number 3 shows, therefore, the circuit connections for the highest fixed speed when the motors are in series. The portion of the field winding which is influenced by the armature current is now short-circuited and the battery is in control of the field excitation, so that the motors will have a fairly constant speed irrespective of the load. Two portions of the field regulating resistances $T^1$ and $T^2$ are now included in their respective field circuits and the speed is now supposed to be nearly twice the speed obtained with full field strength. Diagram Number 7 in this figure shows the motors connected in parallel under weak field strength. The last portions of the field regulating resistances $T^1$ and $T^2$ have been added to their respective field circuits and it will, therefore, be understood that the speed at no load would now be more than twice the speed obtained with full field strength. But, as the load increases, the motors will slow down (precisely as in diagram Number 7 of Fig. 1) chiefly because those portions of the field windings, which are directly influenced by the armature current, are now included in the circuit. In order that the motors may be equally effective as generators when they are being driven by the load, it is essential that the storage batteries $B^1$ and $B^2$ should be of comparatively large ampere capacity, so that they may be able to supply all the necessary current for the field excitation, although the current has reversed its direction in the armature circuits. A practical example may be of interest:—Assume two 40 H. P. 500 volt tramway motors of the inter-pole type; 66 amperes each. The various resistances of each motor would then be about as follows:—Resistance of the armature and the inter-pole windings $=.35$ ohms. Resistance of the excitation winding $=.25$ ohms.

Total resistance of the field regulating resistance about =.44 ohms. Resistance of the balancing resistance about =.20 ohms. The storage batteries $B^1$ and $B^2$ should each have a capacity of about 10 volts and 110 amperes.

I do not limit myself to the particular circuit connections and arrangement of parts herein shown and described, but aim in the appended claims to cover all modifications which are within the scope of my invention.

Having thus described my invention what I claim and desire to secure by Letters Patent of the United States is—

1. The method of operating a plurality of series motors arranged to drive a common load, which consists in connecting the motors to the line with each motor field in series with its armature, impressing independent and practically constant voltages upon the several field circuits and regulating the field excitation by varying the ohmic resistances of the said field circuits.

2. The method of operating a plurality of series motors arranged to drive a common load, which consists in connecting the motors to the line with each motor field in series with its armature, supplying independent currents of excitation to the several field circuits and varying the amounts of said currents by varying the ohmic resistances of the said field circuits.

3. The method of operating a plurality of series motors arranged to drive a common load, which consists in connecting the motors to the line first in series and then in parallel, impressing independent and practically constant voltages upon the several field circuits and regulating the field excitation by varying the ohmic resistances of the said field circuits.

4. The method of regulating two or more series motors having their field circuits connected with independent sources of current supply, which consists in connecting the motors in series and in parallel and in changing the field strength so that it is practically independent of the armature current at the lowest speed combinations but dependent upon said armature current at the highest speed combinations.

5. The combination of a line circuit or main source of current supply, a series motor, a regulating resistance or resistances connected in series with the field winding of the motor, and an independent source of E. M. F. connected in shunt to both the field winding and the said regulating resistance or resistances for the purpose described.

6. A plurality of series motors arranged to be connected in series and in parallel; in combination with a plurality of sources of independent and practically constant E. M. F. connected to their respective field windings for the purposes described.

7. The combination of a series motor field regulating resistance operatively connected to the field winding of the motor, a line circuit supplying the motor with current at constant potential and a source of E. M. F. opposed to that of the line and connected in shunt to both the field winding and the field regulating resistances, substantially as shown and described.

8. A pair of series motors having their fields connected to independent sources of current supply and arranged to be connected in series and in parallel; in combination with means for keeping the current from a power circuit closed through one of the motors during the change from series to parallel (or from parallel to series) and additional means for disconnecting the field circuit of the other motor from its source of independent current supply during the aforesaid change from series to parallel.

9. Two or more series motors the speed of which is chiefly varied by changes in the E. M. F. applied to the individual armature circuits; in combination with means for varying the field strengths of the motors independently of their armature currents and additional means for changing the field strength from a field which is practically independent of the armature current at low speeds to a field which becomes partly dependent upon the armature current at the highest speeds.

In testimony whereof I have signed my name to this specification in the presence of two subscribing witnesses.

ROBERT LUNDELL.

Witnesses:
C. J. KINTNER,
M. F. KEATING.